United States Patent
Michelini et al.

(10) Patent No.: US 10,217,199 B2
(45) Date of Patent: Feb. 26, 2019

(54) SYSTEM, METHOD AND STORAGE MEDIUM FOR DYNAMIC RANGE EXPANSION OF DIGITAL IMAGE

(71) Applicant: BOE Technology Group Co., Ltd., Beijing (CN)

(72) Inventors: Pablo Navarrete Michelini, Beijing (CN); Han Yan, Beijing (CN); Ran Duan, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/745,032

(22) PCT Filed: Jul. 12, 2017

(86) PCT No.: PCT/CN2017/092593
§ 371 (c)(1),
(2) Date: Jan. 15, 2018

(87) PCT Pub. No.: WO2018/099087
PCT Pub. Date: Jun. 7, 2018

(65) Prior Publication Data
US 2019/0012772 A1    Jan. 10, 2019

(30) Foreign Application Priority Data
Nov. 29, 2016 (CN) .......................... 2016 1 1073013

(51) Int. Cl.
G06T 5/00 (2006.01)
G06T 5/40 (2006.01)
G06F 17/16 (2006.01)

(52) U.S. Cl.
CPC .............. *G06T 5/009* (2013.01); *G06F 17/16* (2013.01); *G06T 5/40* (2013.01)

(58) Field of Classification Search
CPC ................................. G06T 5/009; G06T 5/40
See application file for complete search history.

(56) References Cited

U.S. PATENT DOCUMENTS

| 2003/0068097 A1* | 4/2003 | Wilson ..................... G06F 17/18 382/276 |
| 2011/0178953 A1* | 7/2011 | Johannes ............... G06Q 40/06 705/36 R |

(Continued)

FOREIGN PATENT DOCUMENTS

| CN | 1750043 A | 3/2006 |
| CN | 102231264 A | 11/2011 |

(Continued)

OTHER PUBLICATIONS

Sep. 28, 2017—International Search Report and Written Opinion Appn PCT/CN2017/092593 with Eng Tran.

(Continued)

*Primary Examiner* — Gandhi Thirugnanam
(74) *Attorney, Agent, or Firm* — Banner & Witcoff, Ltd.

(57) ABSTRACT

A system for dynamic range expansion of digital images includes: an optimizing device configured to calculate and store the output histogram of the previous frame of image data, calculate and obtain the mapping function according to the output histogram of the previous frame of image data and obtain the mapping table of the previous frame of image data according to the mapping function; and a mapping device configured to receive a next frame of image data and process the next frame of image data with the mapping table of the previous frame of image data to generate the enhanced image data. The present system enables processing ultrahigh definition images with very low requirements on hardware requirement. There is further provided a method and a non-volatile storage medium for dynamic range expansion of digital images.

20 Claims, 5 Drawing Sheets

(56) References Cited

U.S. PATENT DOCUMENTS

| | | | | |
|---|---|---|---|---|
| 2012/0106937 A1* | 5/2012 | Molin | .................. | G03B 13/36 |
| | | | | 396/121 |
| 2012/0143037 A1* | 6/2012 | Najarian | ................ | A61B 6/032 |
| | | | | 600/407 |
| 2014/0056517 A1* | 2/2014 | Schaschek | ................ | G06T 5/40 |
| | | | | 382/169 |
| 2018/0075643 A1* | 3/2018 | Sequeira | .............. | G01C 21/206 |

FOREIGN PATENT DOCUMENTS

| | | |
|---|---|---|
| CN | 104200447 A | 12/2014 |
| CN | 105049831 A | 11/2015 |
| CN | 105787898 A | 7/2016 |

OTHER PUBLICATIONS

Arici, Tarik, "A Histogram Modification Framework and Its Application for Image Contrast Enhancement", IEEE Transactions on Image Processing, vol. 18, No. 9, Sep. 2009, pp. 1921-1935.

* cited by examiner

SYSTEM, METHOD AND STORAGE MEDIUM FOR DYNAMIC RANGE EXPANSION OF DIGITAL IMAGE

The application is a U.S. National Phase Entry of International Application No. PCT/CN2017/092593 filed on Jul. 12, 2017, designating the United States of America and claiming priority to Chinese Patent Application No. 201611073013.7 filed on Nov. 29, 2016. The present application claims priority to and the benefit of the above-identified applications and the above-identified applications are incorporated by reference herein in their entirety.

TECHNICAL FIELD

The present disclosure relates to the image processing field, more specifically to a system, a method and a computer executable non-volatile storage medium for dynamic range expansion of digital image or video signal.

BACKGROUND

A digital image is represented by a 2D array with a size of the integer of width×height. Colors are represented by 3 arrays of different formats such as RGB, YUV and LUV and sometime the fourth channel is also used to represent a transparent region (alpha channel). The present disclosure only focuses on analyzing luminance data rather than color or transparency, that is called 1 channel representing luminance such as the Y channel of format YUV. In digital images, the most common integer data format (bit depth) is unsigned 8 bits/pixels (with a value from 0 to 255).

In a display panel, after gamma correction, the luminance value is converted to (cd/m2) with a range from the lowest Y=0 (darkest) level to the highest Y=2 bit depth −1 (brightest) level. The luminance range covered by the display panel is referred to as the dynamic range of the display panel.

Digital images may not use all available luminance levels. For example, an 8 bit/pixel image may use only Y values from 64 to 191, which only covers 50% of the entire range of 0 to 255. An image with low (large) luminance value coverage is called a low (high) dynamic range image (LDR or HDR image respectively).

SUMMARY

According to at least one embodiment of this disclosure, a system for dynamic range expansion of digital images is provided, comprising: a configuring device configured to generate a first parameter and a second parameter and obtain a value of a block tridiagonal matrix according to the first parameter and the second parameter; an analyzing device configured to calculate a histogram of an input previous frame of image data and an histogram equalization of the input previous frame of image data and store the histogram of the previous frame of image data and the histogram equalization of the previous frame of image data; an optimizing device configured to calculate and store an output histogram of the previous frame of image data using an equation comprising the block tridiagonal matrix according to the first parameter, the second parameter and the block tridiagonal matrix from the configuring device, and the histogram of the previous frame of image data and the histogram equalization of the previous frame of image data from the analyzing device, calculate and obtain a mapping function according to the output histogram of the previous frame of image data and obtain and store a mapping table of the previous frame of image data according to the mapping function; and a mapping device configured to receive a next frame of image data and process the next frame of image data with the mapping table of the previous frame of image data to generate enhanced image data.

For example, the analyzing device is configured to, when each frame of image arrives, calculate the histogram of the incoming frame of image data and the histogram equalization of the incoming frame of image data.

For example, during a time interval after the previous frame of image is acquired and before the next frame of image arrives, the optimizing device is configured to calculate and obtain the mapping table of the previous frame of image data.

For example, when each frame of image arrives, the mapping device is configured to process the incoming frame of image data with the mapping table of the previous frame of image data of the incoming frame of image data to generate the enhanced image data.

For example, histogram gaps of pixel features are processed with symmetric difference to obtain the block tridiagonal matrix.

For example, the block tridiagonal matrix is:

$$S = \begin{bmatrix} D_a & U & 0 & 0 & \ldots \\ L & D_b & U & 0 & \ldots \\ 0 & L & D_b & U & \ldots \\ \vdots & \vdots & \vdots & \vdots & \ddots \end{bmatrix}$$

wherein $$D_a = \begin{bmatrix} \gamma/4 + (1+\lambda) & 0 \\ 0 & \gamma/4 + (1+\lambda) \end{bmatrix},$$

$$D_b = \begin{bmatrix} \gamma + (1+\lambda) & 0 \\ 0 & \gamma + (1+\lambda) \end{bmatrix}$$

and $$L = U = \begin{bmatrix} -2\gamma & 0 \\ 0 & -2\gamma \end{bmatrix}.$$

For example, the equation comprising the block tridiagonal matrix is: $Sh_{out} = h_{input} + \lambda h_{EQ}$, wherein, $h_{input}$ is the histogram of the input image, $h_{EQ}$ is the histogram equalization of the input image, S is the block tridiagonal matrix, $h_{out}$ is the output histogram and $\lambda$ is a constant parameter.

For example, a block tridiagonal method is utilized to solve the equation comprising the block tridiagonal matrix to obtain the output histogram.

For example, the first parameter and the second parameter are obtained according to experiments.

According to at least one embodiment of this disclosure, a method for dynamic range expansion of digital images is provided, comprising: generating a first parameter and a second parameter and obtaining a value of a block tridiagonal matrix according to the first parameter and the second parameter; calculating a histogram of an input previous frame of image data and a histogram equalization of the input previous frame of image data and storing the histogram of the previous frame of image data and the histogram equalization of the previous frame of image data; calculating and storing an output histogram of the previous frame of image data using an equation comprising the block tridiagonal matrix according to the first parameter and the second parameter, the block tridiagonal matrix and the histogram of the previous frame of image data and the histogram equalization of the previous frame of image data, calculating and obtaining a mapping function according to the output histogram of the previous frame of image data and obtaining and storing a mapping table of the previous frame of image data according to the mapping function; and receiving a next frame of image data and processing the next frame of image data with the mapping table of the previous frame of image data to generate the enhanced image data.

For example, when each frame of image arrives, the histogram of the incoming frame of image data and the histogram equalization of the incoming frame of image data are calculated and stored.

For example, during a time interval after the previous frame of image is acquired and before the next frame of image arrives, the mapping table of the previous frame of image data is calculated and obtained.

For example, when each frame of image arrives, the incoming frame of image data is processed with the mapping table of the previous frame of image data of the incoming frame of image data to generate the enhanced image data.

For example, histogram gaps of pixel features are processed with symmetric difference to obtain the block tridiagonal matrix.

For example, the block tridiagonal matrix is:

$$S = \begin{bmatrix} D_a & U & 0 & 0 & \cdots \\ L & D_b & U & 0 & \cdots \\ 0 & L & D_b & U & \cdots \\ \vdots & \vdots & \vdots & \vdots & \ddots \end{bmatrix}$$

wherein, $$D_a = \begin{bmatrix} \gamma/4 + (1+\lambda) & 0 \\ 0 & \gamma/4 + (1+\lambda) \end{bmatrix},$$

$$D_b = \begin{bmatrix} \gamma + (1+\lambda) & 0 \\ 0 & \gamma + (1+\lambda) \end{bmatrix}$$

and $$L = U = \begin{bmatrix} -2\gamma & 0 \\ 0 & -2\gamma \end{bmatrix}.$$

For example, the equation comprising the block tridiagonal matrix is:

$Sh_{out} = h_{input} + \lambda h_{EQ}$; wherein, $h_{input}$ is the histogram of the input image, $h_{EQ}$ is the histogram equalization of the input image, S is the block tridiagonal matrix, $h_{out}$ is the output histogram and $\lambda$ is a constant parameter.

For example, a block tridiagonal method is utilized to solve the block tridiagonal matrix equation to obtain the output histogram.

For example, the first parameter and the second parameter are obtained according to experiments.

According to at least one embodiment of this disclosure, a computer executable non-volatile storage medium is provided, in which program instructions are stored that, while being executed by the computer, cause the computer to: generating a first parameter and a second parameter and obtaining a value of a block tridiagonal matrix according to the first parameter and the second parameter; calculating a histogram of an input previous frame of image data and a histogram equalization of the input previous frame of image data and storing the histogram of the previous frame of image data and the histogram equalization of the previous frame of image data; calculating and storing an output histogram of the previous frame of image data with an equation comprising the block tridiagonal matrix according to the first parameter and the second parameter, the block tridiagonal matrix and the histogram of the previous frame of image data and the histogram equalization of the previous frame of image data, calculating and obtaining a mapping function according to the output histogram of the previous frame of image data and obtaining and storing a mapping table of the previous frame of image data according to the mapping function; and receiving a next frame of image data and processing the next frame of image data with the mapping table of the previous frame of image data to generate the enhanced image data.

For example, when each frame of image arrives, the histogram of the incoming frame of image data and the histogram equalization of the incoming frame of image data are calculated and stored.

Additional aspects and advantages of the present disclosure will be set forth in part in the following description, and may be observed evidently in part from the description or may be obtained in practice of the present disclosure.

Embodiments of the present disclosure disclose a system, a method and a storage medium for expanding dynamic range of digital images or video signals. As compared with the prior art, it is not only possible to process ultrahigh definition images but also impose very low requirements on hardware system. Accordingly, the present disclosure enables processing ultrahigh definition images with very low requirements on hardware requirement. The more complex problem of improving enhancement effect is addressed.

The present disclosure addresses the following problems.

1. The system $Sh = h_{input} + \lambda h_{EQ}$ is redefined with different matrices S to improve image enhancement.

2. A system and a method is proposed to solve $Sh = h_{input} + \lambda h_{EQ}$ on a FPGA and enhance video signals in a LCD display.

The present disclosure improves images' visual effect by increasing contrast and controlling visual artifacts such as noises and strips. And the present disclosure provides a system that may be implemented on FPGA with small amount of resources.

BRIEF DESCRIPTION OF DRAWINGS

The above-mentioned and other objects, features and advantages of the present disclosure will become clearer from the detail description of preferred embodiments of the present disclosure with respect to accompanying drawings in which the same numerals denote units with the same structure and wherein.

DETAILED DESCRIPTION

Figure 1:
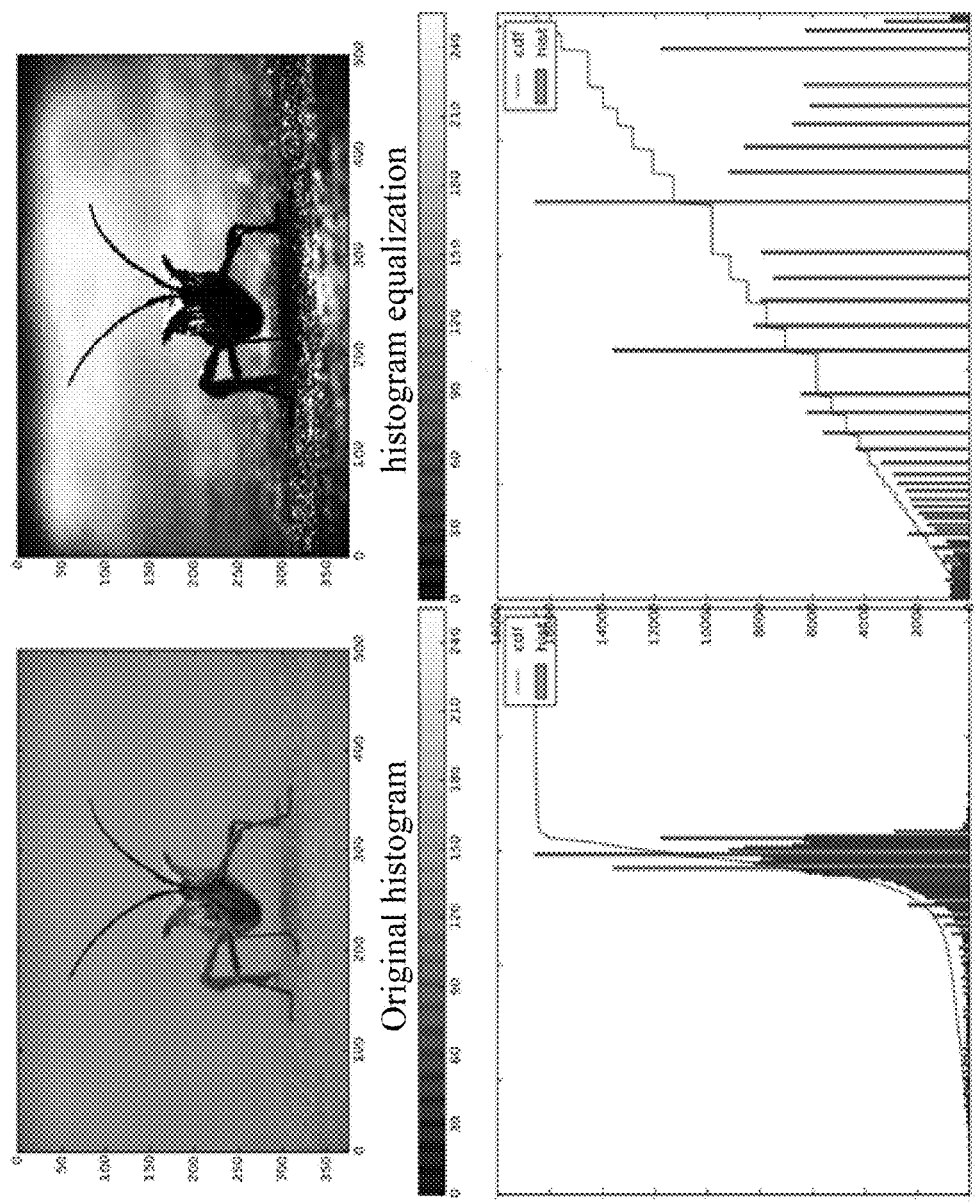
FIG. 1 shows a raw image on the left and a histogram equalized image on the right.

The present disclosure will be described fully below with reference to accompanying drawings that show embodiments of the present disclosure. Nevertheless, the present disclosure may be embodied in many different forms rather than limited to embodiments described herein. To the contrary, these embodiments are provided in order to make the present disclosure thorough and complete and convey the scope of the present disclosure to those skilled in the art fully. In the drawings, components are exaggerated for sake of clarity.

Modern standards for digital television such as BT.2020 are increasing the bit depth of an image to at least 10 bit/pixel. This is driven by the capability of modern display panels of covering a high dynamic range (such as >1000 cd/m2). In HDR (High Dynamic Range) displays, difference values in luminance between successive luminance features ($\Delta Y=1$) increases and becomes more visible. Therefore, for HDR displays, it is feasible to increase bit depth of images to reduce gaps between adjacent pixel features of unwanted artifacts that may occur (such as luminance strips, increased noise or visible compression artifacts).

A popular feature in modern HDR displays is to increase dynamic range of the input image to exhibit maximum amount of details and produce better user experience. The standard contrast enhancer (for example, simply rescaling range of value to cover 100% of the luminance feature) is not suitable for such applications since they would generate many undesired effects such as image flickers in video, color strips and increased noise. The simple contrast enhancer does not consider it's possible to use the distribution of pixel features of 100% dynamic range and most pixels may still concentrate in low dynamic range. The distribution of pixel features in image Y may be seen in its histogram (hY(n)):

In hY(n), in a frame of image, Y equals to the number of pixel points of n,

Wherein Y is the grey scale value.

Or in the cumulative distribution function (CDF) of Y (cDFY(n)):

In cDFY(n), in a frame of image, Y<=the total number of pixel points of n.

Wherein Y is the grey scale value.

FIG. 1 shows a raw image on the left and a histogram equalized image on the right.

For a LDR (Low Dynamic Range) image, the CDF value increases sharply in the narrow range of pixel values used by the image (see the left side of FIG. 1). The standard technology for enhancing contrast that considers pixel distribution is histogram equalization (HEQ). As shown in FIG. 1 on the right side, HEQ uniformly distribute pixel values and generates CDF with similar linear increase. HEQ generates the maximum possible increase of dynamic range. However, some time it may cause excessively enhanced output, may not provide control parameters and may not be capable of controlling noise and strip artifacts (referring to FIG. 1).

A particular problem with HEQ as shown in FIG. 1 is the redistribution of pixel features in case of not using intermediate values. This would generate large gaps in the histogram and the abrupt change in CDF is visible in the image. For example, several new solutions may control and improve the effect of HEQ using numerical optimization method. An ideal method called histogram smoothing generates an optimized output histogram $h_{opt}$ such that:

$$h_{opt} = \text{ArgMin}_h \|h - h_{input}\|^2 + \lambda \|h - h_{EQ}\|^2 + \gamma \|Dh\|^2 \quad \text{Equation 1}$$

This means that $h_{opt}$ is the histogram h that generates the minimum sums of 3 components: 1) the sum having the square error of the input histogram $h_{input}$, 2) the sum of square errors of HEQ $h_{EQ}$ weighted by a constant parameter $\lambda$, 3) the sum of square values of difference values of histogram step sizes D h weighted by the constant parameter $\gamma$. Here D h is a matrix vector multiplication:

$$D = \begin{bmatrix} -1 & 1 & 0 & \ldots & 0 & 0 & 0 \\ 0 & -1 & 1 & \ldots & 0 & 0 & 0 \\ \vdots & \vdots & \vdots & \ldots & \vdots & \vdots & \vdots \\ 0 & 0 & 0 & \ldots & -1 & 1 & 0 \\ 0 & 0 & 0 & \ldots & 0 & -1 & 1 \end{bmatrix}$$

D is the parameter matrix in Equation 1.

For example, the solution of the optimization problem may be computed by solving the linear equation 2, $$Sh_{out} = h_{input} + \lambda h_{EQ} \quad \text{Equation 2,}$$

wherein $$S = \begin{bmatrix} 2\gamma + (1+\lambda) & -2\gamma & 0 & 0 & \ldots \\ -2\gamma & 4\gamma + (1+\lambda) & -2\gamma & 0 & \ldots \\ 0 & -2\gamma & 4\gamma + (1+\lambda) & -2\gamma & \ldots \\ \vdots & \vdots & \vdots & \vdots & \ddots \end{bmatrix}$$

S is the parameter matrix of equation 2. Equation 2 is the transformed form of Equation 1.

For example, given the input image X, the optimized image Y may be obtained by the following process:

1. calculating the histogram $h_{input}$ of input image and the histogram equalization $h_{EQ}$ of input image.

2. calculating the output image histogram $h_{out}$ by solving a triple diagonal matrix equation $Sh_{out} = h_{input} + \lambda h_{EQ}$, wherein $\lambda$ and $\gamma$ are constant parameters with specific values typically configured differently according to different systems.

3. calculating the mapping function:

$$T[n] = \left\lfloor \frac{(2^B - 1)}{W \cdot H} \sum_{j=0}^{n} h_{out}[j] + 0.5 \right\rfloor$$

wherein $\lfloor x \rfloor$ is the maximum integer smaller than x, W is the width, H is the height, W×H is the number of all pixel points in the image, and B is the bit depth.

4. For each input pixel Y[i, j], giving the output pixel with the following formula:

$$out[i,j] = T[Y[i,j]]$$

For example, $sh_{out} = h_{input} + \lambda h_{EQ}$ may be solved with equation solver of triple diagonal matrix but can not be applied to a LCD display.

For the above problem, the above-mentioned triple diagonal matrix equation is optimized in the present disclosure to get an optimized output histogram.

Figure 3:
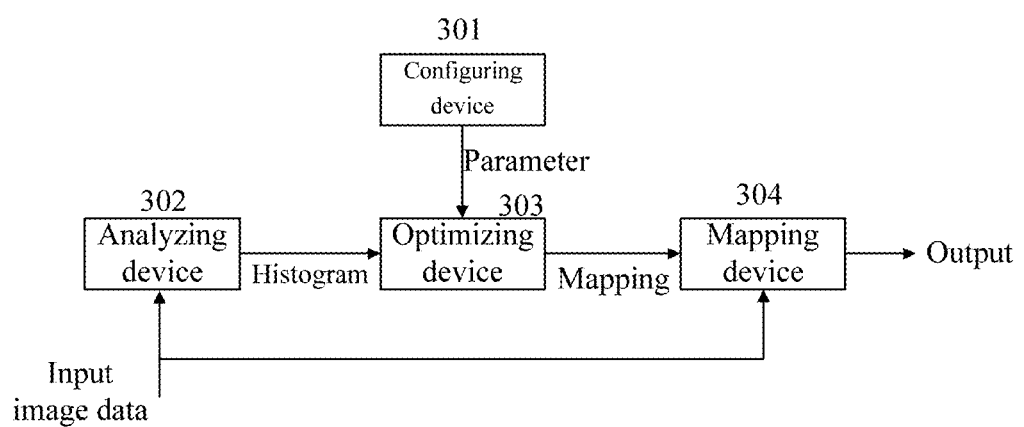
FIG. 3 shows a block diagram of a system for dynamic range expansion of digital images according to an embodiment of the present disclosure.

FIG. 3 shows a block diagram of a system for dynamic range expansion of digital images according to an embodiment of the present disclosure.

Figure 2:
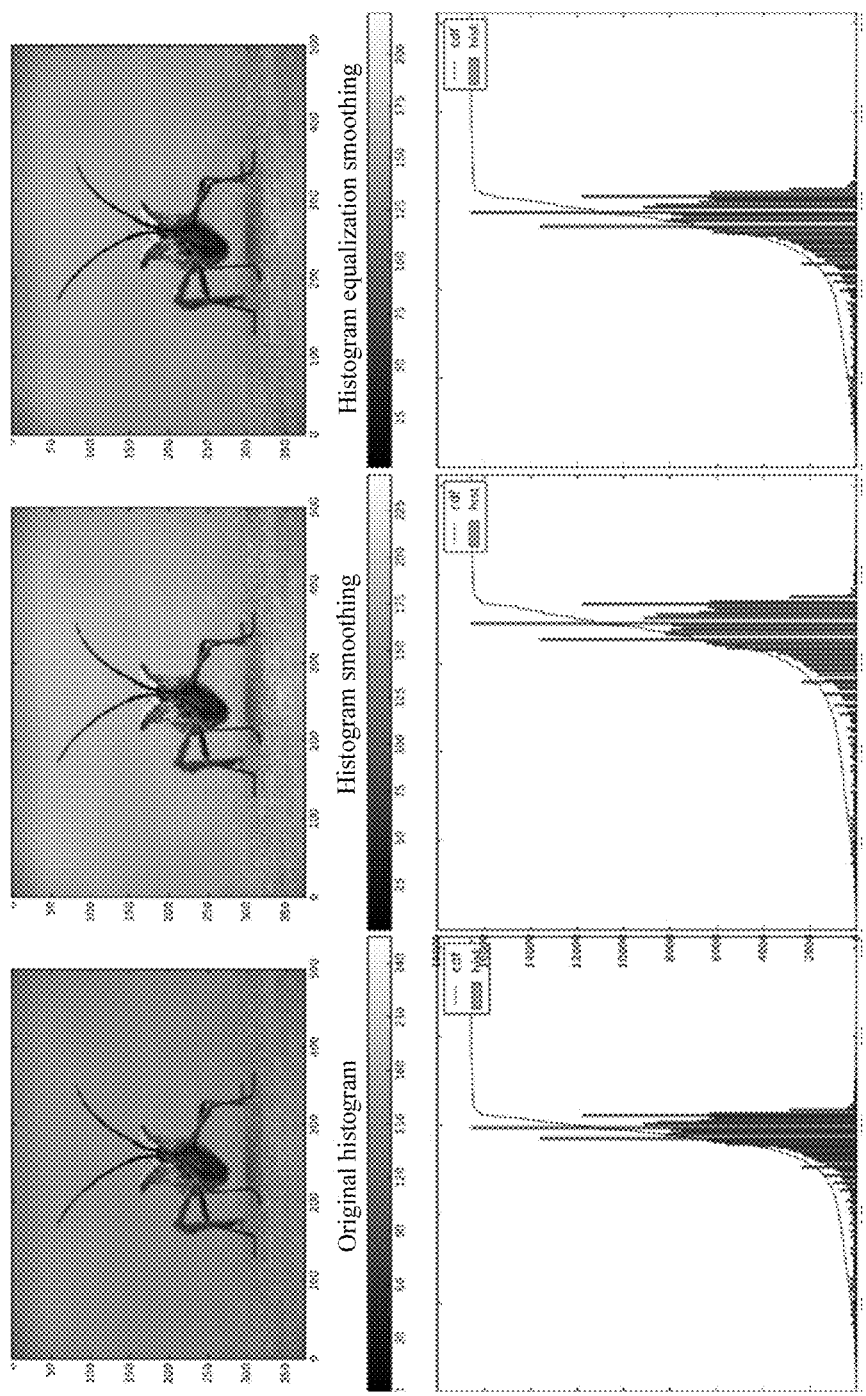
FIG. 2 shows a raw image on the left, a histogram smooth image in the middle and a histogram equalized smooth image on the right.

In the aforementioned example, histogram gaps at pixel feature n are processed according to the forward difference h(n+1)−h(n) which would certainly cause entire upper shift of the distribution of the pixel features, resulting in more bright effect for the image. FIG. 2 shows a raw image on the left, a histogram smooth image in the middle and a histogram equalized smooth image on the right. As shown in FIG. 2, the processed image does not match the original image and the luminance and contrast are changed, decreasing the capability of enhancing dynamic range. It is also sensitive to gap positions and generates flickers in the video signals.

In the present disclosure, symmetric difference is utilized to process the histogram gaps at the pixel feature n, that is $h[n+1]-h[n-1]$.

The corresponding matrix D for the symmetric difference is:

$$D = \frac{1}{2}\begin{bmatrix} 0 & 0 & 0 & 0 & \ldots & 0 & 0 & 0 & 0 \\ -1 & 0 & 1 & 0 & \ldots & 0 & 0 & 0 & 0 \\ 0 & -1 & 0 & 1 & \ldots & 0 & 0 & 0 & 0 \\ \vdots & \vdots & \vdots & \vdots & & \vdots & \vdots & \vdots & \vdots \\ 0 & 0 & 0 & 0 & \ldots & -1 & 0 & 1 & 0 \\ 0 & 0 & 0 & 0 & \ldots & 0 & -1 & 0 & 1 \\ 0 & 0 & 0 & 0 & \ldots & 0 & 0 & 0 & 0 \end{bmatrix}$$

A block triple diagonal matrix equation for the optimized output histogram is in turn obtained as $Sh_{out}=h_{input}+\lambda h_{EQ}$, wherein $$S = \begin{bmatrix} \gamma/4+(1+\lambda) & 0 & -2\gamma & 0 & 0 & 0 & \ldots \\ 0 & \gamma/4+(1+\lambda) & 0 & -2\gamma & 0 & 0 & \ldots \\ -2\gamma & 0 & \gamma+(1+\lambda) & 0 & 0 & 0 & \ldots \\ 0 & -2\gamma & 0 & \gamma+(1+\lambda) & 0 & 0 & \ldots \\ \vdots & \vdots & \vdots & \vdots & \vdots & \vdots & \ddots \end{bmatrix}$$

Now the matrix S is not tridiagonal, but block tridiagonal with blocks of 2×2 size, namely:

$$S = \begin{bmatrix} D_a & U & 0 & 0 & \ldots \\ L & D_b & U & 0 & \ldots \\ 0 & L & D_b & U & \ldots \\ \vdots & \vdots & \vdots & \vdots & \ddots \end{bmatrix}$$

wherein $$D_a = \begin{bmatrix} \gamma/4+(1+\lambda) & 0 \\ 0 & \gamma/4+(1+\lambda) \end{bmatrix},$$

$$D_b = \begin{bmatrix} \gamma+(1+\lambda) & 0 \\ 0 & \gamma+(1+\lambda) \end{bmatrix}$$

and $$L = U = \begin{bmatrix} -2\gamma & 0 \\ 0 & -2\gamma \end{bmatrix}.$$

These 2×2 block matrices are all diagonal and are therefore easily inverted. Then it is possible to solve the matrix equation with a block tridiagonal equation solver.

In the present disclosure, the block triple diagonal matrix equation $Sh=h_{input}+\lambda h_{EQ}$ is solved with the block tridiagonal method. The system utilizes the fixed point algorithm to address the problem of a bit depth of 10 bit/pixel and an image resolution of 8K (4320×7680).

As shown in FIG. 3, The system for dynamic range expansion of digital image includes an optimizing device 303 and a mapping device 304.

According to one example of the present disclosure, the optimizing device 303 is configured to calculate and store the output histogram of the previous frame of image data; calculate and obtain the mapping function according to the output histogram of the previous frame of image data; and obtain the mapping table of the previous frame of image data according to the mapping function and store the mapping table.

The mapping device 304 is configured to receive the next frame of image data and process the next frame of image data with the mapping table of the previous frame of image data to generate enhanced image data.

According to yet another example of the present disclosure, in order to calculate and store the output histogram of the previous frame of image data, as shown in FIG. 3, the system for dynamic range expansion of digital image may further include a configuring device 301 and an analyzing device 302.

As discussed above, in the block triple diagonal matrix equation, the block triple diagonal matrix S includes parameters γ and λ. Parameters γ and λ are generally configured differently according to different systems.

The configuring device 301 is configured to generate suitable parameters γ and λ (parameters γ and λ suitable for different systems may be obtained according to experiments) and obtain values of block triple diagonal matrices S and D according to parameters γ and λ.

If γ and λ are fixed, it is possible to calculate values of the block triple diagonal matrices S and D in advance with software without running on the FPGA (Field Programmable Gate Array).

The analyzing device 302 is configured to calculate the histogram of the input previous frame of image data and the histogram equalization of the input previous frame of image data and store the histogram of the previous frame of image data and the histogram equalization of the previous frame of image data.

The optimizing device 303 is configured to calculate and store the output histogram of the previous frame of image data, using the block triple diagonal matrix equation, according to parameters γ and λ, and the block triple diagonal matrix S from the configuring device 301, and the histogram of the previous frame of image data and the histogram equalization of the previous frame of image data from the analyzing device 302; calculate and obtain the mapping function according to the output histogram of the previous frame of image data, and obtain the mapping table of the previous frame of image data according to the mapping function and store the mapping table.

Among them, as the block triple diagonal matrix equation, the equation $Sh_{out}=h_{input}+\lambda h_{EQ}$ may be used, or other equations may be used.

Among them, as the mapping function, the following mapping function $$T[n] = \left\lfloor \frac{(2^B-1)}{W \cdot H} \sum_{j=0}^{n} h_{out}[j] + 0.5 \right\rfloor$$

may be used; or other mapping functions may also be used.

The mapping device 304 is configured to receive the next frame of image data and process the next frame of image data with the mapping table of the previous frame of image data to generate enhanced image data.

The mapping device 304 further includes an user-defined adjustment parameter CT. The value may be changed from 0 (no effect) to 64 (strongest effect). The user may control the enhancement degree of the algorithm of the present disclosure via the parameter CT.

According to prior art system, it is possible to generate enhanced image data with the mapping table only after processing all pixels of each frame of digital image as above. For video signals, if image enhancement is applied frame by frame, the frame buffer is needed for storing pixels of input image data, calculating the optimal mapping table and finally outputting enhanced images. Large amount of resources will be needed for UHD (Ultra High Definition Television).

In embodiments of the present disclosure, a method is applied that analyzes the previous frame and applies enhancement in the next frame, which saves resources, enhances invisible details in images and prevents existing noises or artifacts in images from becoming visible.

Various devices in the above-mentioned system may be implemented by any software, hardware and firmware such as processor. The processor may be a central processing unit (CPU) or other form of processing unit that has the data processing capability and/or program execution capability such as an graphic processing unit (GPU), a field programmable gate array (FPGA) or a tensor processing unit (TPU) etc. It is possible to store one or more computer programs on a computer-readable storage medium which may be run by the above-mentioned processor to implement the above-mentioned various functions.

Figure 4:
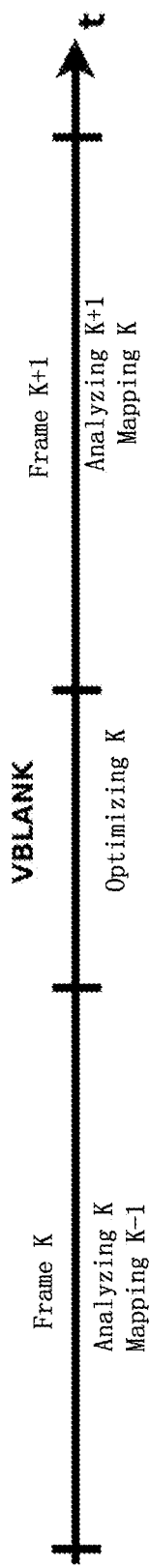
FIG. 4 shows a timing diagram of dynamic range expansion of image data according to an embodiment of the present disclosure.

FIG. 4 shows a timing diagram of dynamic range expansion of image data according to an embodiment of the present disclosure.

As shown in FIG. 4, when the k+1th frame arrives, it is analyzed to calculate its histogram and it is processed with the mapping table from the information on the kth frame at the same time, and the processed output image is displayed. The optimizing device 303 implements processing in the time interval between two frames (namely, VBLANK time).

For example, while powering on, the first frame is unchanged and used to obtain a mapping table to process the second frame, the second frame is used to obtain a mapping table to process the third frame, . . . and the kth frame is used to obtain a mapping table to process the k+1th frame, and so on. And, what is displayed is always the output image obtained by processing the next frame with the mapping table optimized with the previous frame.

Assuming that successive two frames are denoted as k and k+1, the processing timing is as follows:

1. Calculate the histogram of the kth frame while the kth frame is input;
2. Complete the histogram statistics after the kth frame is input;
3. In the Vblank interval between the kth and k+1th frames, obtain the optimized output histogram of the kth frame by operation according to the histogram, obtain the mapping function according to the output histogram, and obtain and store the mapping table of the kth frame according to the mapping function;
4. While the k+1th frame is input, with each pixel of the k+1th frame as the input to the above-mentioned mapping table, conduct mapping and obtain outputs of each pixel of the k+1th frame according to the mapping table as the processed output image of the k+1th frame and output for displaying; while the k+1th frame is input, also repeat the process of the above-mentioned steps 1 to 3 to obtain the mapping table of the k+1th frame for mapping of the k+2th frame, and so on.

Figure 5A:
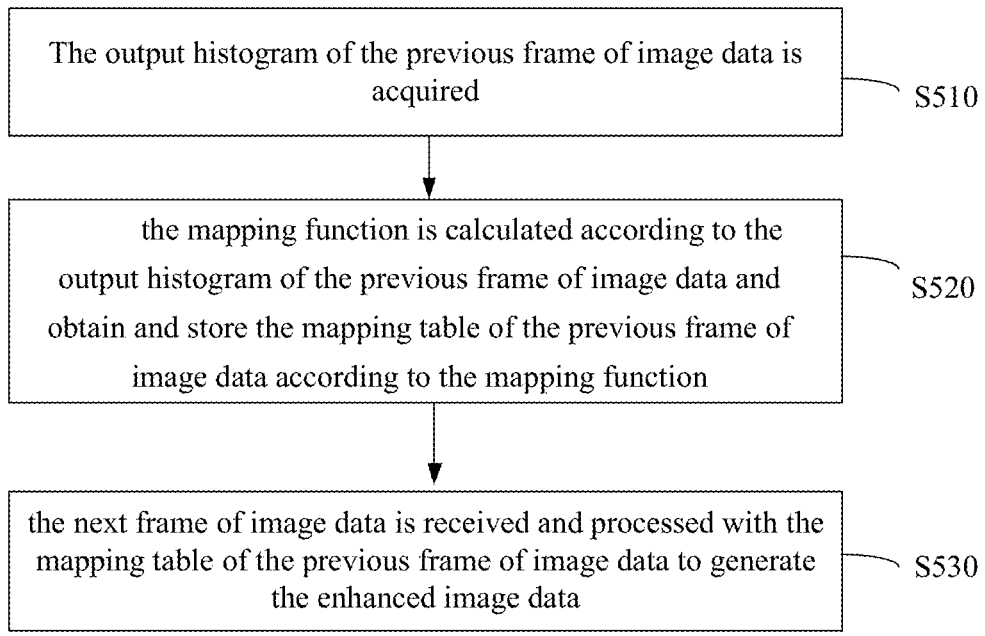
FIG. 5a shows a first flow chart of a method for dynamic range expansion of digital images according to an embodiment of the present disclosure.

FIG. 5a shows a first flow chart of a method for dynamic range expansion of digital images according to an embodiment of the present disclosure.

According to one example of the present disclosure, referring to FIG. 5a, the method for dynamic range expansion of digital image may include the following steps.

In step S510, the output histogram of the previous frame of image data is acquired.

In step S520, the mapping function is calculated according to the output histogram of the previous frame of image data and obtain and store the mapping table of the previous frame of image data according to the mapping function.

In step S530, the next frame of image data is received and processed with the mapping table of the previous frame of image data to generate the enhanced image data.

Figure 5B:
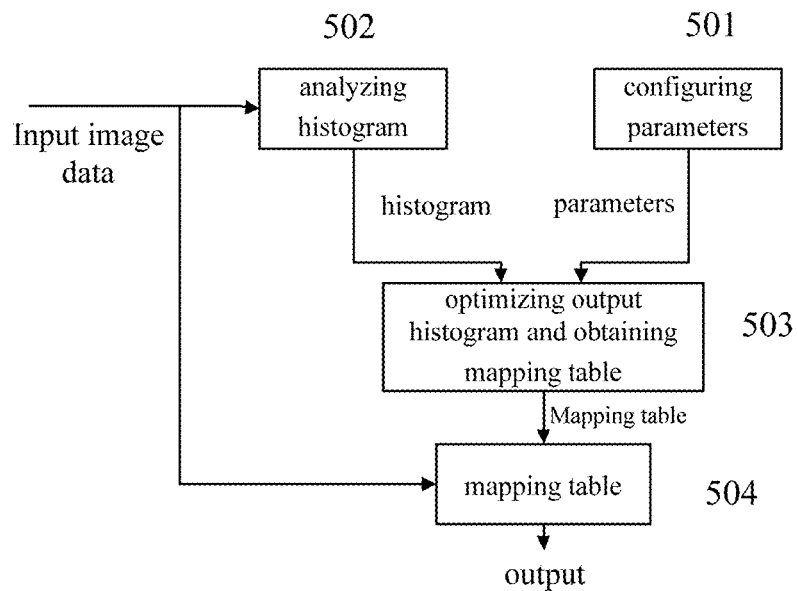
FIG. 5b shows another flow chart of a method for dynamic range expansion of digital images according to an embodiment of the present disclosure.

FIG. 5b shows another flow chart of a method for dynamic range expansion of digital images according to an embodiment of the present disclosure. The blocks of the block triple diagonal matrix S include parameters γ and λ. Parameters γ and λ are generally configured differently according to different systems. As shown in FIG. 5b, in step 501, suitable parameters γ and λ (parameters γ and λ suitable for different systems may be obtained according to experiments) are configured and values of block triple diagonal matrices S and D are obtained according to parameters γ and λ.

If γ and λ are fixed, in step 501, it is possible to calculate values of the block triple diagonal matrices S and D in advance with software without running on the FPGA (Field Programmable Gate Array).

In step 502, the histogram of the input previous frame of image data and the histogram equalization of the input previous frame of image data are calculated and the histogram of the previous frame of image data and the histogram equalization of the previous frame of image data are stored.

In step 503, the output histogram of the previous frame of image data is calculated and stored with the block triple diagonal matrix equation $Sh_{out}=h_{input}+\lambda h_{EQ}$ according to parameters γ and λ, the block triple diagonal matrix S and the histogram of the previous frame of image data and the histogram equalization of the previous frame of image data; the mapping function is calculated and obtained according to the output histogram of the previous frame of image data; and the mapping table of the previous frame of image data is obtained according to the mapping function and the mapping table is stored.

In step 504, the next frame of image data is received and processed with the mapping table of the previous frame of image data to generate the enhanced image data.

Among them, as the mapping function, the following mapping function $$T[n] = \left\lfloor \frac{(2^B - 1)}{W \cdot H} \sum_{j=0}^{n} h_{out}[j] + 0.5 \right\rfloor$$

may be used; or other mapping functions may also be used.

Step 504 further includes that the user controls the enhancement degree of the algorithm of the present disclosure by the user-defined adjustment parameter CT. The value may be changed from 0 (no effect) to 64 (strongest effect).

The present disclosure has the following advantages.

As compared with HEQ, the present disclosure can obtain better quality effect because its distribution controls pixels in gaps between pixel features in the output histogram. As compared with HEQ, the present disclosure reduces noises and strip artifacts.

As compared with the histogram smoothing in the aforementioned embodiments, the present disclosure has improved visual effect and may also be implemented in FPGA. The histogram smoothing can vary luminance levels in the output image and decrease the capability of expanding the dynamic range. The present disclosure provides a system and a method for implementing enhancer in FPGA with small amount of resources. The technical problem that it is too complex to implement histogram smoothing in FPGA is addressed.

As compared with the weighted histogram and partial histogram approximation, the present disclosure realizes better quality effect and the present disclosure is better than the histogram smoothing.

Furthermore, in the present disclosure, it is possible to analyze the entire image frame to obtain optimized solution. Local histogram approximation uses small block if image for speeding up processing. In the present disclosure, the necessity of frame buffer is avoided by applying the optimized result of the previous frame to the next frame.

In addition, according to at least one embodiment of the present disclosure, there is further provided a computer executable non-volatile storage medium. The non-volatile memory may comprise for example read only memory (ROM), hard disk, erasable programmable read only memory (EPROM), portable read only memory, USB memory and flash memory. Program instructions are stored in the medium which, while being executed by a computer, carry out the following steps:

acquiring the output histogram of the previous frame of image data;

calculating and obtaining the mapping function according to the output histogram of the previous frame of image data and obtaining and storing the mapping table of the previous frame of image data according to the mapping function; and receiving the next frame of image data and processing the next frame of image data with the mapping table of the previous frame of image data to generate the enhanced image data.

According to yet another embodiment of the present disclosure, the following steps may also be carried out when the computer executes the program instructions stored in the medium:

generating a first parameter and a second parameter and obtaining the value of the block triple diagonal matrix according to the first parameter and the second parameter;

calculating the histogram of the input previous frame of image data and the histogram equalization of the input previous frame of image data and storing the histogram of the previous frame of image data and the histogram equalization of the previous frame of image data;

calculating and storing the output histogram of the previous frame of image data with a block triple diagonal matrix equation according to the first parameter and the second parameter, the block triple diagonal matrix and the histogram of the previous frame of image data and the histogram equalization of the previous frame of image data.

Furthermore, when each frame of image arrives, the histogram of the incoming frame of image data and the histogram equalization of the incoming frame of image data are calculated and stored.

The above-mentioned method steps executed by the computer are similar to those in aforementioned embodiments and the aforementioned embodiments may be referred to for details which will not be described any more herein. Unless otherwise defined, all the terms as used herein (including technology and science terms) have the same meanings as commonly understood by those skill in the art to which the present disclosure belongs. It will further be appreciated that terms such as those defined in common dictionaries should be interpreted as having meanings consistent with their meanings in the context of related art rather than being interpreted as having ideal or extremely formal senses, unless defined as such specifically herein.

Example embodiments of the present disclosure are described herein with reference to block diagrams and flow charts that support the method, the device (system) and the computer program product according to embodiments of the present disclosure. It will be appreciated that each block of the flow charts and/or block diagrams and combination of blocks of the flow charts and/or the block diagrams may be implemented by computer program instructions. These computer program instructions may be supplied to a general purpose computer, a dedicated computer or the processor of other programmable data processing device to produce machines such that instructions executed by the processors of the computer or other programmable data processing device generate means for implementing functions/actions specified in blocks of the flow charts and/or the block diagrams.

These computer program instructions may also be stored in the computer readable memory and may direct the computer or other programmable data processing device to operate in a certain manner such that instructions stored in the computer readable memory generate manufactured articles including instruction means for implementing functions/actions specified in blocks of the flow charts and/or block diagrams.

The computer program instructions may also be loaded to the computer or other programmable data processing device to cause a series of operation steps to be executed on the computer or other programmable device to generate processing implemented by the computer such that instructions executed on the computer or other programmable device provide steps for implementing functions/actions specified in blocks of the flow charts and/or block diagrams. Each block may represent a code module, a section or a part including one or more executable instructions configured to implement specified logic functions. It should further be noted that in other implementations, functions denoted in blocks may not occur in the order specified in the drawings. For example, according to the related functions, two successively shown blocks may be executed substantially concurrently in fact or blocks may be executed in opposite orders some times.

Above is to illustrate this disclosure, and not limit the scope of the disclosure; although this disclosure is illustrated with multiple exampled embodiments, those skilled in the art should know that, they can still make modifications to the exampled embodiments on the premise of not being against novelty and advantages of this disclosure, and these modifications and variations will not make the substance of the corresponding technical solution to depart from the scope of the technical solution of the embodiments of this disclosure, they should all fall into the scope of the claims and specification of this disclosure. This disclosure is limited by the claims and their equivalents.

The present application claims priority of China Patent application No. 201611073013.7 filed on Nov. 29, 2016, the content of which is incorporated in its entirety as part of the present application by reference herein.

The invention claimed is:

1. A system for dynamic range expansion of digital images, comprising:

a configuring device configured to generate a first parameter and a second parameter and obtain a value of a block tridiagonal matrix according to the first parameter and the second parameter;

an analyzing device configured to calculate a histogram of an input previous frame of image data and an histogram equalization of the input previous frame of image data and store the histogram of the previous frame of image data and the histogram equalization of the previous frame of image data;

an optimizing device configured to calculate and store an output histogram of the previous frame of image data using an equation comprising the block tridiagonal matrix according to the first parameter, the second parameter and the block tridiagonal matrix from the configuring device, and the histogram of the previous frame of image data and the histogram equalization of the previous frame of image data from the analyzing device, calculate and obtain a mapping function according to the output histogram of the previous frame of image data and obtain and store a mapping table of the previous frame of image data according to the mapping function; and a mapping device configured to receive a next frame of image data and process the next frame of image data with the mapping table of the previous frame of image data to generate enhanced image data.

2. The system of claim 1, wherein the analyzing device is configured to, when each frame of image arrives, calculate the histogram of the incoming frame of image data and the histogram equalization of the incoming frame of image data.

3. The system of claim 1, wherein during a time interval after the previous frame of image is acquired and before the next frame of image arrives, the optimizing device is configured to calculate and obtain the mapping table of the previous frame of image data.

4. The system of claim 1, wherein when each frame of image arrives, the mapping device is configured to process the incoming frame of image data with the mapping table of the previous frame of image data of the incoming frame of image data to generate the enhanced image data.

5. The system of claim 1, wherein
histogram gaps of pixel features are processed with symmetric difference to obtain the block tridiagonal matrix.

6. The system of claim 1, wherein the block tridiagonal matrix is:

$$S = \begin{bmatrix} D_a & U & 0 & 0 & ... \\ L & D_b & U & 0 & ... \\ 0 & L & D_b & U & ... \\ \vdots & \vdots & \vdots & \vdots & \ddots \end{bmatrix}$$

wherein $$D_a = \begin{bmatrix} \gamma/4 + (1+\lambda) & 0 \\ 0 & \gamma/4 + (1+\lambda) \end{bmatrix},$$

$$D_b = \begin{bmatrix} \gamma + (1+\lambda) & 0 \\ 0 & \gamma + (1+\lambda) \end{bmatrix}$$

and $$L = U = \begin{bmatrix} -2\gamma & 0 \\ 0 & -2\gamma \end{bmatrix}.$$

7. The system of claim 1, wherein the equation comprising the block tridiagonal matrix is:

$$Sh_{out} = h_{input} + \lambda h_{EQ}$$

wherein, $h_{input}$ is the histogram of the input image, $h_{EQ}$ is the histogram equalization of the input image, S is the block tridiagonal matrix, $h_{out}$ is the output histogram and $\lambda$ is a constant parameter.

8. The system of claim 7, wherein a block tridiagonal method is utilized to solve the equation comprising the block tridiagonal matrix to obtain the output histogram.

9. The system of claim 1, wherein the first parameter and the second parameter are obtained according to experiments.

10. A method for dynamic range expansion of digital images, comprising:

generating a first parameter and a second parameter and obtaining a value of a block tridiagonal matrix according to the first parameter and the second parameter;

calculating a histogram of an input previous frame of image data and a histogram equalization of the input previous frame of image data and storing the histogram of the previous frame of image data and the histogram equalization of the previous frame of image data;

calculating and storing an output histogram of the previous frame of image data using an equation comprising the block tridiagonal matrix according to the first parameter and the second parameter, the block tridiagonal matrix and the histogram of the previous frame of image data and the histogram equalization of the previous frame of image data, calculating and obtaining a mapping function according to the output histogram of the previous frame of image data and obtaining and storing a mapping table of the previous frame of image data according to the mapping function; and receiving a next frame of image data and processing the next frame of image data with the mapping table of the previous frame of image data to generate the enhanced image data.

11. The method of claim 10, wherein when each frame of image arrives, the histogram of the incoming frame of image data and the histogram equalization of the incoming frame of image data are calculated and stored.

12. The method of claim 10, wherein during a time interval after the previous frame of image is acquired and before the next frame of image arrives, the mapping table of the previous frame of image data is calculated and obtained.

13. The method of claim 10, wherein when each frame of image arrives, the incoming frame of image data is processed with the mapping table of the previous frame of image data of the incoming frame of image data to generate the enhanced image data.

14. The method of claim 10, wherein, histogram gaps of pixel features are processed with symmetric difference to obtain the block tridiagonal matrix.

15. The method of claim 10, wherein the block tridiagonal matrix is:

$$S = \begin{bmatrix} D_a & U & 0 & 0 & ... \\ L & D_b & U & 0 & ... \\ 0 & L & D_b & U & ... \\ \vdots & \vdots & \vdots & \vdots & \ddots \end{bmatrix}$$

wherein $$D_a = \begin{bmatrix} \gamma/4 + (1+\lambda) & 0 \\ 0 & \gamma/4 + (1+\lambda) \end{bmatrix},$$

$$D_b = \begin{bmatrix} \gamma + (1+\lambda) & 0 \\ 0 & \gamma + (1+\lambda) \end{bmatrix}$$

and $$L = U = \begin{bmatrix} -2\gamma & 0 \\ 0 & -2\gamma \end{bmatrix}.$$

16. The method of claim 10, wherein the equation comprising the block tridiagonal matrix is:

$$Sh_{out} = h_{input} + \lambda h_{EQ};$$

wherein, $h_{input}$ is the histogram of the input image, $h_{EQ}$ is the histogram equalization of the input image, S is the block tridiagonal matrix, $h_{out}$ is the output histogram and λ is a constant parameter.

17. The method of claim 16, wherein a block tridiagonal method is utilized to solve the block tridiagonal matrix equation to obtain the output histogram.

18. The method of claim 10, wherein the first parameter and the second parameter are obtained according to experiments.

19. A computer executable non-volatile storage memory in which program instructions are stored that, while being executed by the computer, cause the computer to:
generating a first parameter and a second parameter and obtaining a value of a block tridiagonal matrix according to the first parameter and the second parameter;
calculating a histogram of an input previous frame of image data and a histogram equalization of the input previous frame of image data and storing the histogram of the previous frame of image data and the histogram equalization of the previous frame of image data;
calculating and storing an output histogram of the previous frame of image data with an equation comprising the block tridiagonal matrix according to the first parameter and the second parameter, the block tridiagonal matrix and the histogram of the previous frame of image data and the histogram equalization of the previous frame of image data, calculating and obtaining a mapping function according to the output histogram of the previous frame of image data and obtaining and storing a mapping table of the previous frame of image data according to the mapping function; and
receiving a next frame of image data and processing the next frame of image data with the mapping table of the previous frame of image data to generate the enhanced image data.

20. The storage memory of claim 19, wherein
when each frame of image arrives, the histogram of the incoming frame of image data and the histogram equalization of the incoming frame of image data are calculated and stored.

* * * * *